(12) United States Patent
Krasniqi

(10) Patent No.: US 12,041,530 B2
(45) Date of Patent: Jul. 16, 2024

(54) WIRELESS ACCESS NODE SELECTION BASED ON WIRELESS NETWORK SLICE SUPPORT

(71) Applicant: T-Mobile Innovations LLC, Overland Park, KS (US)

(72) Inventor: Gezim Krasniqi, Issaquah, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 154 days.

(21) Appl. No.: 17/406,336

(22) Filed: Aug. 19, 2021

(65) Prior Publication Data

US 2023/0058696 A1  Feb. 23, 2023

(51) Int. Cl.
*H04W 48/10* (2009.01)
*H04W 36/08* (2009.01)

(52) U.S. Cl.
CPC .......... *H04W 48/10* (2013.01); *H04W 36/08* (2013.01)

(58) Field of Classification Search
CPC ... H04W 48/10; H04W 36/08; H04W 36/083; H04W 36/085; H04W 36/087; H04W 36/13; H04W 48/20
See application file for complete search history.

(56) References Cited

U.S. PATENT DOCUMENTS

| | | |
|---|---|---|
| 9,042,897 B2 | 5/2015 | Lin |
| 10,390,331 B2 | 8/2019 | Adjakple et al. |
| 10,779,231 B2 | 9/2020 | Chen |
| 10,904,862 B2 | 1/2021 | Cai et al. |
| 10,966,128 B2 | 3/2021 | Zee et al. |
| 2015/0334612 A1 | 11/2015 | Ray Chaudhuri et al. |

(Continued)

FOREIGN PATENT DOCUMENTS

| | | | |
|---|---|---|---|
| CN | 109743742 A | * | 5/2019 |
| CN | 109743742 A | | 5/2019 |
| CN | 110022583 A | | 7/2019 |

OTHER PUBLICATIONS

Sony ("Slice based Cell Reselection", 3GPP TSG RAN WG2 Meeting# 113bis electronic, R2-2103589, Apr. 12-20, 2021) (Year: 2021).*

(Continued)

*Primary Examiner* — Chi H Pham
*Assistant Examiner* — Ji-Hae Yea

(57) ABSTRACT

A wireless communication network serves a User Equipment (UE) over a wireless network slice. In the wireless communication network, a source wireless access node wirelessly broadcasts information that indicates supporting wireless access nodes that serve the wireless network slice. The broadcast information may comprise a System Information Block (SIB) 1. The UE wirelessly receives the information from the source wireless access node. When the source wireless access node does not comprise one of the supporting wireless access nodes, the UE re-selects one of the supporting wireless access nodes, wirelessly attaches to the selected-supporting wireless access node, and wirelessly exchanges user data for the wireless network slice with the selected-supporting wireless access node. The selected-supporting wireless access node wirelessly exchanges the user data with the UE and exchanges the user data with the wireless network slice. The wireless network slice exchanges the user data with the selected-supporting wireless access node.

20 Claims, 9 Drawing Sheets

(56) References Cited

U.S. PATENT DOCUMENTS

| | | | |
|---|---|---|---|
| 2017/0367036 A1 | 12/2017 | Chen et al. | |
| 2019/0174406 A1 | 6/2019 | Hwang et al. | |
| 2019/0174536 A1* | 6/2019 | Han | H04W 74/0833 |
| 2019/0387554 A1 | 12/2019 | Guo et al. | |
| 2020/0196194 A1* | 6/2020 | Kozat | H04L 41/0806 |
| 2021/0266999 A1* | 8/2021 | Laselva | H04W 76/15 |
| 2021/0282082 A1* | 9/2021 | Mildh | H04W 48/18 |

OTHER PUBLICATIONS

LG Electronics ("Discussion on slice based cell reselection", 3GPP TSG-RAN2 #115-e, R2-2107705, Aug. 16-27, 2021) (Year: 2021).*

CN109743742A—Para 0132-0139 (Google English Translated) (Year: 2019).*

LG Electronics; "Discussion on slice based cell reselection"; 3GPP TSG-RAN2 #115-e; Aug. 2021; pp. 1-3; R2-2107705; 3GPP; Sophia Antipolis, France.

Sony; "Slice based Cell Reselection"; 3GPP TSG RAN WG2 Meeting# 113bis electronic; Apr. 2021; 2 pages; R2-2103589; 3GPP; Sophia Antipolis, France.

Ferrus, et al.; "On 5G Radio Access Network Slicing: Radio Interface Protocol Features and Configuration"; IEEE Communications Magazine; May 2018; pp. 184-192; vol. 56, No. 5; IEEE; Piscataway, U.S.A.

LG Electronics Inc.; "Broadcast information for slice aware cell selection/cell reselection"; 3GPP TSG-RAN2 #113e; Jan. 2021; pp. 1-3; R2-2100767; 3GPP; Sophia Antipolis, France.

* cited by examiner

US 12,041,530 B2

WIRELESS ACCESS NODE SELECTION BASED ON WIRELESS NETWORK SLICE SUPPORT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into network data centers. The network elements comprise Access and Mobility Management Functions (AMFs), Session Management Functions (SMFs), User Plane Functions (UPFs), Application Server Function (ASFs), and the like.

Some network elements like UPFs are used to form wireless network slices that deliver specific data services like low-latency augmented-reality or high-bandwidth media-streaming. A wireless user device hosts user applications that consume the data services and are served by the wireless network slices that correspond to the user applications. For example, a wireless user device may execute an augmented-reality application and responsively request a low-latency wireless network slice that features a local augmented-reality server. Another wireless user device may execute a movie application and responsively request a high-bandwidth wireless network slice that features a content-delivery server.

Several different types of wireless access nodes and wireless network slices are being deployed. The amount of different slice types is also proliferating rapidly. Unfortunately, some wireless access node cannot effectively serve some wireless network slices. Moreover, the wireless user devices inefficiently attach to the wireless access nodes in response to the user applications and the wireless network slices that are currently in use.

TECHNICAL OVERVIEW

A wireless communication network serves a User Equipment (UE) over a wireless network slice. In the wireless communication network, a source wireless access node wirelessly broadcasts information that indicates supporting wireless access nodes that serve the wireless network slice. The broadcast information may comprise a System Information Block (SIB) 1. The UE wirelessly receives the information from the source wireless access node. When the source wireless access node does not comprise one of the supporting wireless access nodes, the UE selects one of the supporting wireless access nodes, wirelessly attaches to the selected-supporting wireless access node, and wirelessly exchanges user data for the wireless network slice with the selected-supporting wireless access node. The selected-supporting wireless access node wirelessly exchanges the user data with the UE and exchanges the user data with the wireless network slice. The wireless network slice exchanges the user data with the selected-supporting wireless access node.

DETAILED DESCRIPTION

Figure 1:
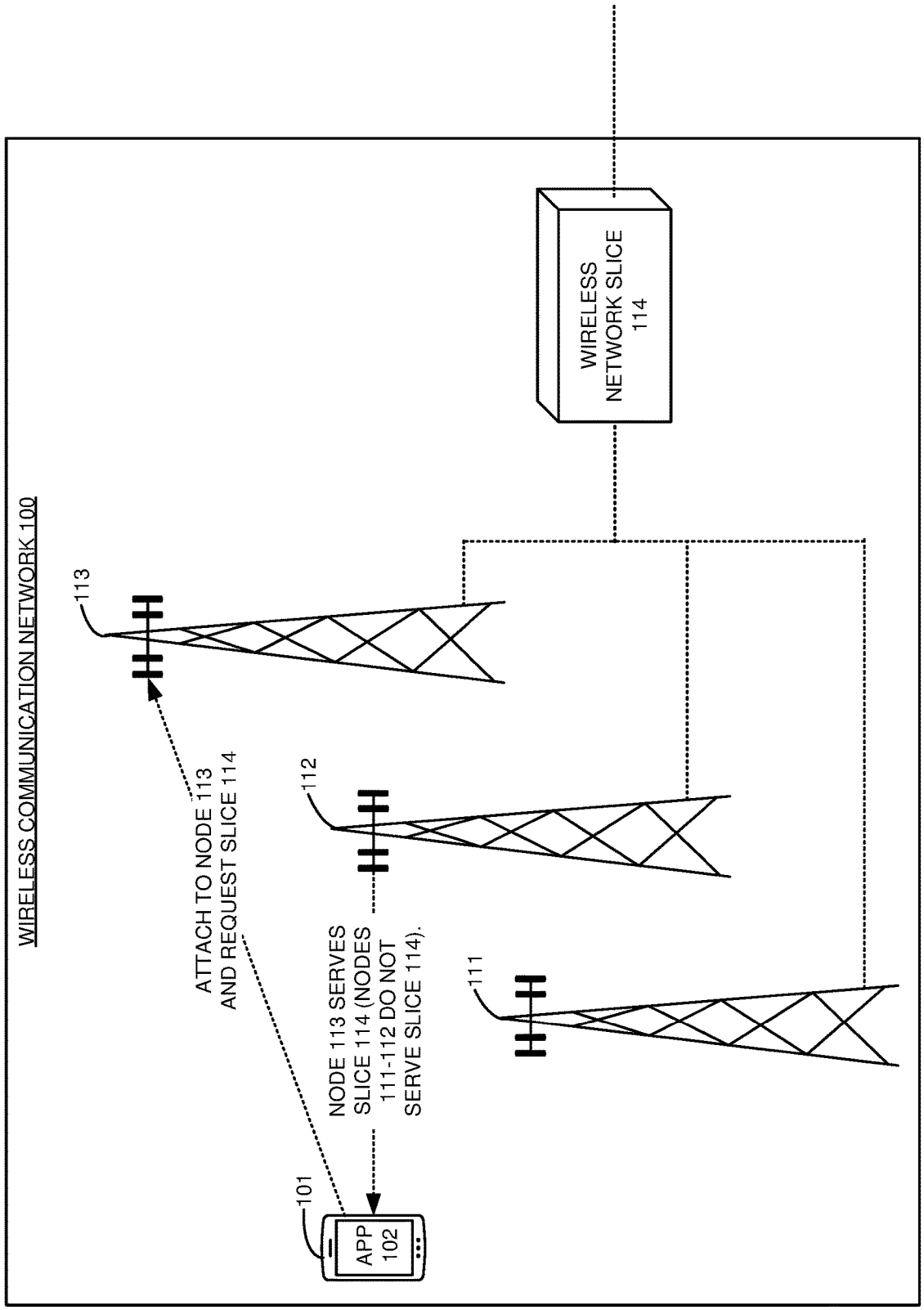
FIG. 1 illustrates a wireless communication network to serve a User Equipment (UE) over a wireless network slice.

FIG. 1 illustrates wireless communication network 100 to serve User Equipment (UE) 101 over wireless network slice 114. Wireless communication network 100 comprises UE 101, wireless access nodes 111-113, and wireless network slice 114. UE 101 comprises a computer, phone, vehicle, sensor, robot, or some other data appliance with communication circuitry. UE 101 executes user application (APP) 102 to receive a wireless data service like augmented-reality, media-streaming, or some other wireless networking product. Wireless communication network 100 is simplified and typically includes more UEs, user applications, wireless access nodes, and wireless network slices than the amount shown.

Various examples of network operation and configuration are described herein. In some examples, wireless access node 112 wirelessly broadcasts information which indicates that wireless access node 113 serves wireless network slice 114 but that wireless access nodes 111-112 do not serve wireless network slice 114. UE 101 wirelessly receives the information from source wireless access node 112. When wireless access nodes 111-112 do not support wireless network slice 114 and wireless access node 113 does support wireless network slice 114, UE 101 re-selects wireless access node 113. UE 101 wirelessly attaches to wireless access node 113 and requests wireless network slice 114. UE 101 and wireless access node 113 wirelessly exchange user data for wireless network slice 114. Wireless access node 113 wirelessly exchanges the user data with UE 101 and exchanges the user data with wireless network slice 114. Wireless network slice 114 exchanges the user data with wireless access node 113. Advantageously, wireless access node 113 effectively serves wireless network slice 114. Moreover, UE 101 efficiently attaches to wireless access node 113 when user application 102 and wireless network slice 114 are used.

In some examples, the broadcast information comprises a System Information Block One (SIB 1) which indicates that wireless access node 113 serves slice 114. The SIB 1 may indicate (alternatively or in addition) that wireless access nodes 111-112 do not serve slice 114. Wireless access nodes 111 and 113 may transfer X2 signaling to source wireless access node 112 that indicates that when nodes 111 and 113 do serve wireless network slice 114 and/or do not serve wireless network slice 114. Source wireless access node 112 modifies its broadcast information in response to the X2 signaling to reflect any changes to the list of wireless access nodes that presently serve wireless network slice 114. For example, wireless access node 111 may transfer X2 signaling to source wireless access node 112 to indicate that node 111 is overloaded on slice 114, so source wireless access node 112 modifies its broadcast information in response to the X2 signaling to indicate that wireless access node 111 is not serving wireless network slice 114. Likewise, wireless access node 113 may recover from an overload and transfer X2 signaling to source wireless access node 112 which indicates that node 113 can again serve slice 114, so source wireless access node 112 modifies its broadcast information in response to the X2 signaling to indicate that wireless access node 113 now serves wireless network slice 114. Based on the broadcast information, UE 101 may re-select wireless access node 113 in response to idling on source wireless access node 112 and launching user application 102 that uses wireless network slice 114. Based on the broadcast information, UE 101 may re-select and connect to wireless access node 113 in response to executing user application 102 that uses wireless network slice 114 while attempting a re-select from source wireless access node 112.

Wireless network slice 114 comprises network elements like User-Plane Function (UPF) and Application Server Function (ASF). UE 101 communicates with wireless access nodes 111-113 over technologies like Fifth Generation New Radio (5GNR), Long Term Evolution (LTE), Institute of Electrical and Electronic Engineers (IEEE) 802.11 (WIFI), Bluetooth, or some other wireless communication protocol. The various communication links in wireless communication network 100 are represented by dotted lines on FIG. 1 and use metallic wiring, glass fibers, radio channels, or some other communication media. These communication links use IEEE 802.3 (Ethernet), Time Division Multiplex (TDM), Data Over Cable System Interface Specification (DOCSIS), WIFI, 5GNR, LTE, Internet Protocol (IP), General Packet Radio Service Transfer Protocol (GTP), virtual switching, inter-processor communication, bus interfaces, and/or some other data communication protocols. UE 101, nodes 111-113, and slice 114 comprise microprocessors, software, memories, transceivers, bus circuitry, and the like. UE 101 and nodes 111-113 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
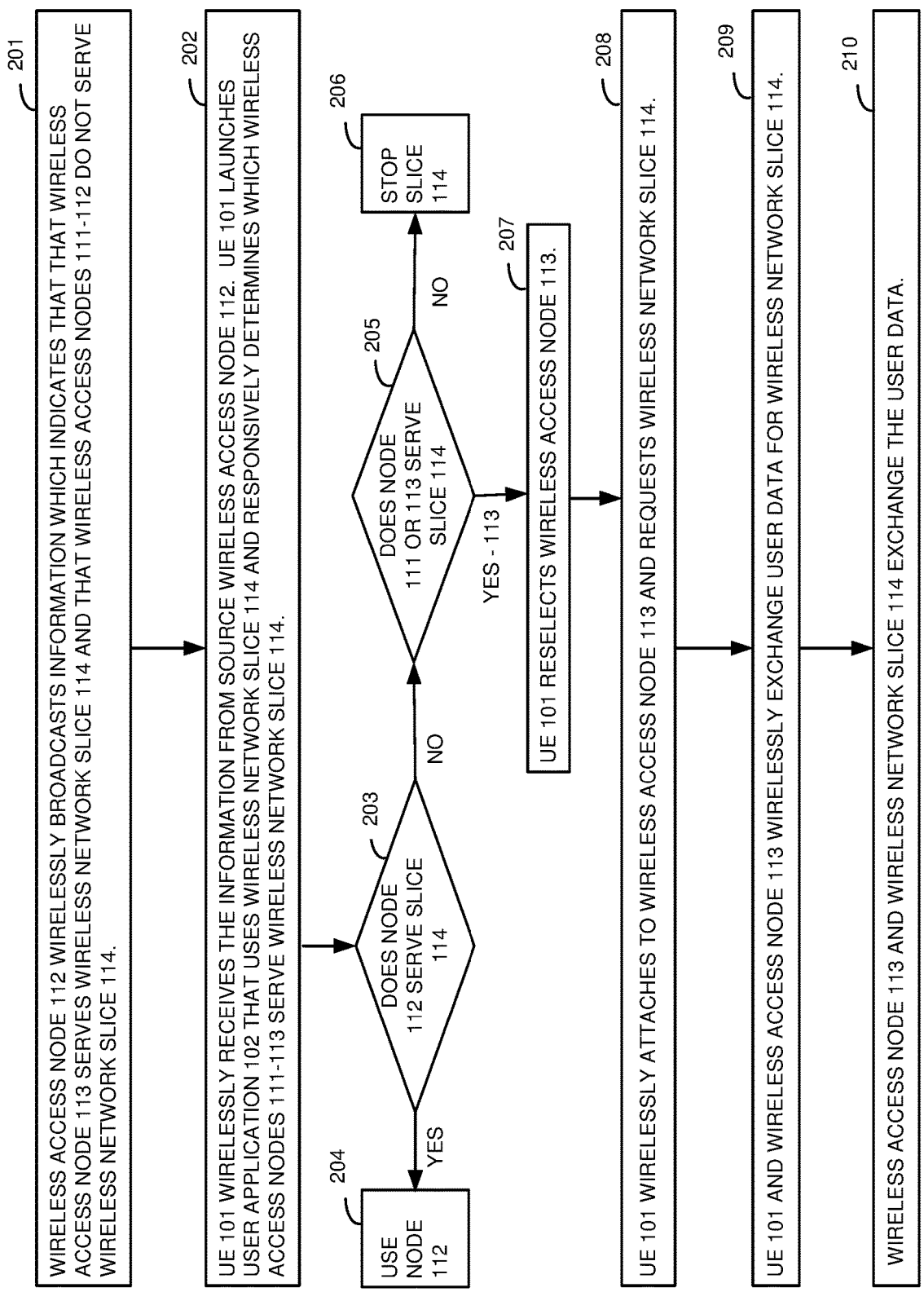
FIG. 2 illustrates an exemplary operation of the wireless communication network to serve the UE over the wireless network slice.

FIG. 2 illustrates an exemplary operation of wireless communication network 100 to serve UE 101 over wireless network slice 114. The operation may vary in other examples. Source wireless access node 112 wirelessly broadcasts information which indicates that wireless access node 113 serves wireless network slice 114 and that wireless access nodes 111-112 do not serve wireless network slice 114 (201). UE 101 wirelessly receives the information from source wireless access node 112 (202). UE 101 launches user application 102 that uses wireless network slice 114 and responsively determines which of wireless access nodes 111-113 serve slice 114 (202). When source wireless access node 112 serves wireless network slice 114 (203), UE 101 uses node 112 to communicate with slice 114 (204). When none of wireless access nodes 111-113 serve slice 114 (203, 205), UE 101 stops slice 114 (206). When one of access nodes 112-113 serves wireless network slice 114 (205), UE 101 re-selects the serving node—node 113 in this example (207). UE 101 wirelessly attaches to selected wireless access node 113 and requests wireless network slice 114 (208). UE 101 and wireless access node 113 wirelessly exchange user data for wireless network slice 114 (209). Wireless access node 113 and wireless network slice 114 exchange the user data (210).

Figure 3:
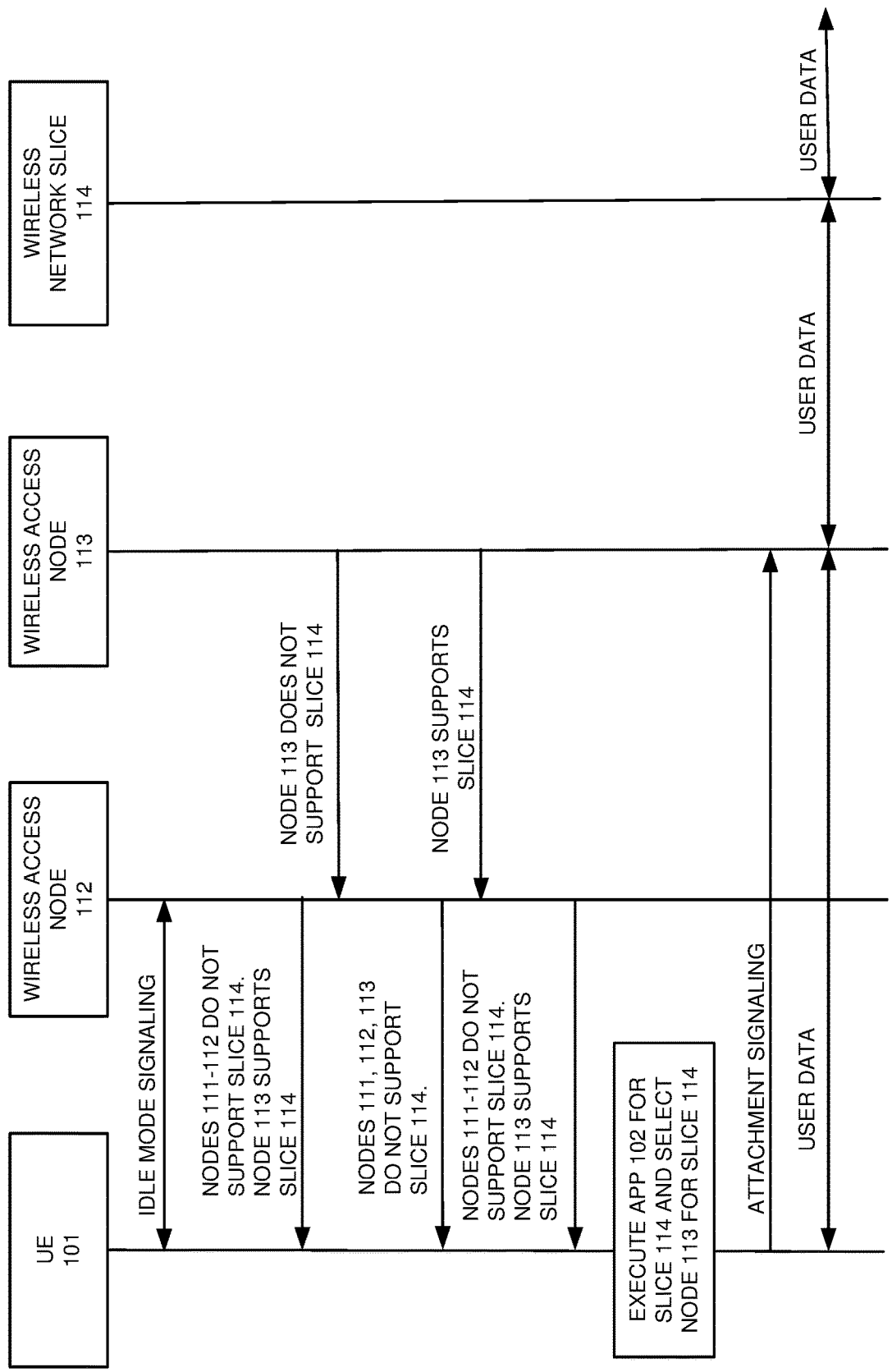
FIG. 3 illustrates an exemplary operation of the wireless communication network to serve the UE over the wireless network slice.

FIG. 3 illustrates an exemplary operation of wireless communication network 100 to serve UE 101 over wireless network slice 114. The operation may vary in other examples. UE 101 is initially in idle mode and exchanges idle mode signaling with wireless access node 112. Wireless access node 112 wirelessly broadcasts information like a SIB which indicates that wireless access nodes 111-112 do not serve wireless network slice 114 and that wireless access node 113 does serve wireless network slice 114. Wireless access node 113 node then detects an issue with its ability to serve wireless network slice 114 like an overload or maintenance. Wireless access node 113 transfers X2 signaling to wireless access node 112 that indicates that node 113 does not currently serve wireless network slice 114. In response, wireless access node 112 wirelessly broadcasts information which indicates that wireless access nodes 111-113 do not serve wireless network slice 114. Wireless access nodes 111-113 are not selected to serve wireless network slice 114 at this time. Wireless access node 113 then detects the ability to serve wireless network slice 114 and transfers X2 signaling to wireless access node 112 that indicates that node 113 serves wireless network slice 114. In response to the X2 signaling, wireless access node 112 wirelessly broadcasts information which indicates that wireless access node 113 serves slice 114 and that wireless access nodes 111-112 do not serve slice 114. UE 101 wirelessly receives the information from wireless access node 112.

While in idle mode, UE 101 executes user application 102 which uses wireless network slice 114. In response, UE 101 re-selects wireless access node 113 based on the broadcast information that indicates slice support for nodes 111-113. UE 101 wirelessly exchanges attachment signaling with wireless access node 113 and requests wireless network slice 114. UE 101 and wireless access node 113 wirelessly exchange user data for wireless network slice 114. Wireless access node 113 and wireless network slice 114 exchange the user data. In this example, wireless network slice 114 exchanges the user data with external systems.

Figure 4:
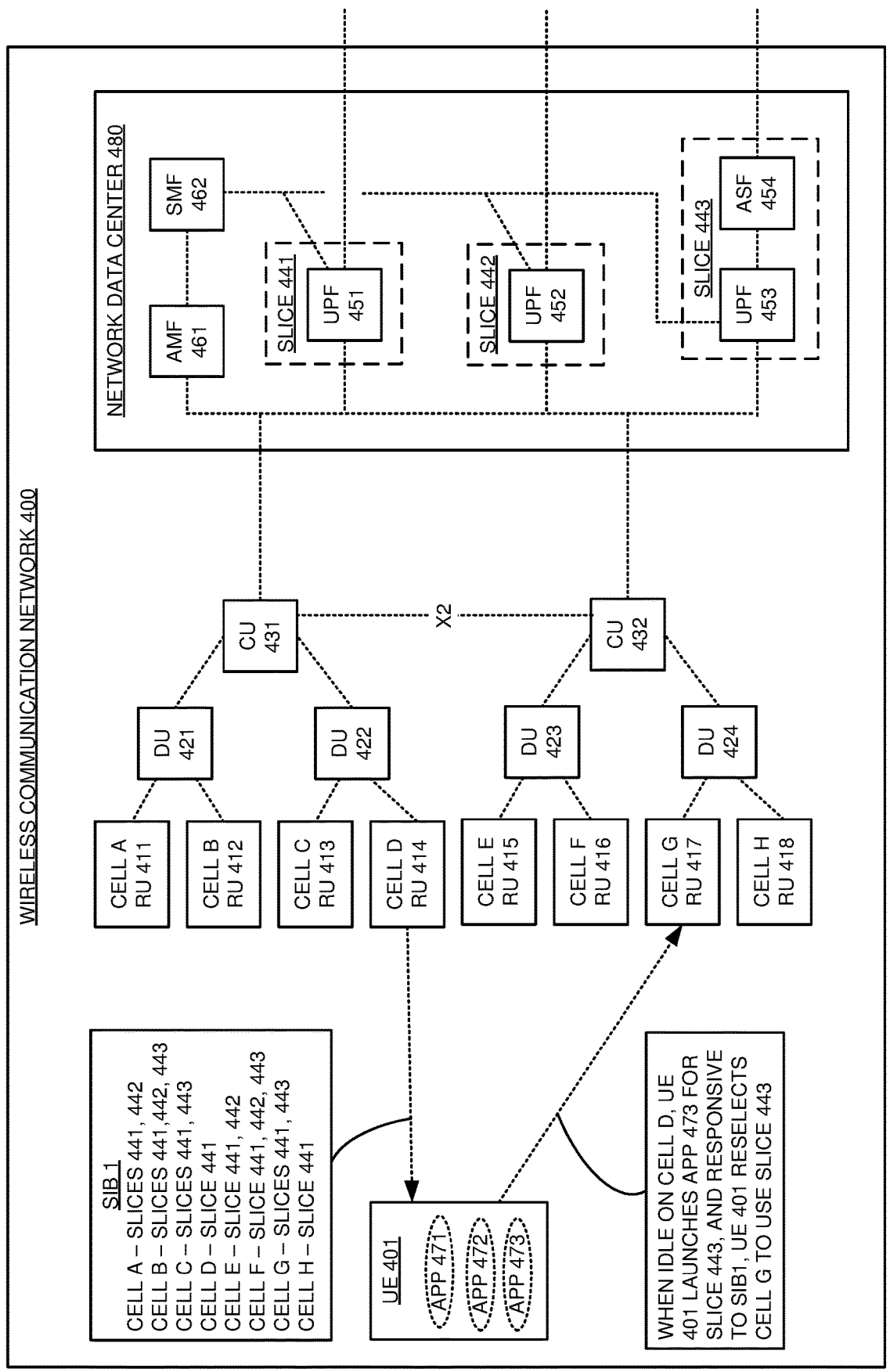
FIG. 4 illustrates a Fifth Generation (5G) wireless communication network to serve a UE over wireless network slices.

FIG. 4 illustrates Fifth Generation (5G) wireless communication network 400 to serve UE 401 over wireless network slices 441-443. 5G wireless communication network 400 comprises an example of wireless communication network 100, although network 100 may differ. 5G wireless communication network 400 comprises UE 401, Radio Units (RUs) 411-418, Distributed Units (DUs) 421-424, Centralized Units (CUs) 431-432, and network data center 480. Network data center 480 comprises wireless network slices 441-443, Access and Mobility Management Function (AMF) 461, and Session Management Function (SMF) 462. Wireless network slice 441 comprises User Plane Function (UPF) 451. Wireless network slice 442 comprises UPF 452. Wireless network slice 441 comprises UPF 453 and Application Server Function (ASF) 454. Additional network elements like Policy Control Function (PCF) and Network Slice Selection Function (NSSF) are typically present but are omitted for clarity.

Wireless network cells A-H are formed by combinations of RUs 411-418, DUs 421-424, and CUs 431-432. For example, a combination of components in CU 431, DU 421, and RU 411 form network cell A. Another combination of components in CU 431, DU 421, RU 412 form network cell B. In this example, RUs 411-418 respectively correspond to a network cells A-H. CUs 431-432 drive RUs 411-418 to wirelessly broadcast System Information Blocks (SIBs) for cells A-H. The broadcast SIBs comprise a SIB 1 that indicates cell IDs A-H and the served ones of wireless network slices 441-443 for each of the cell IDs A-H. The broadcast SIB 1 may also indicate slice load and other status information for the cell/slice pairs.

In CUs 431-432, cells A-H exchange X2 signaling that indicates cell IDs, served slice IDs for each cell ID, and possibly slice status over the cell for cell/slice pairs. In CUs 431-432, cells A-H process the X2 signaling to modify their SIB 1 broadcasts. For example, cell A may become overloaded on slice 442 and indicate to cells B-H to stop indicating that cell A serves slice 442 to mitigate the overload. When the overload subsides, cell A indicates to cells B-H to restart indicating that cell A serves slice 442.

Initially, UE 401 is idle on RU 414 of cell D. UE 401 receives SIB 1 from RU 414. The SIB 1 indicates which individual cells A-H serve which individual slices 441-443. While idle, UE 401 launches user application 473 that communicates with slice 443. UE 401 wirelessly receives SIB 1 from RU 414 for cell D. The SIB 1 indicates that cells B, C, F, and G serve slice 443 but not cell D. In response, UE 401 re-selects cell G based on the SIB 1 and other factors like cell signal strength and cell slice load. UE 401 initiates a re-selection procedure from cell D to cell G. UE 401 requests wireless network slice 443-AMF 461 has already authenticated UE 401 and authorized slice 443 for UE 401. SMF 462 drives UPF 453 in slice 443 for UE 401. User application 473 in UE 401 communicates with ASF 454 in wireless network slice 443 over UPF 453 and cell G (RU 417, DU 424, and CU 432). ASF 454 communicates with an external system like a remote Application Server (AS).

Figure 5:
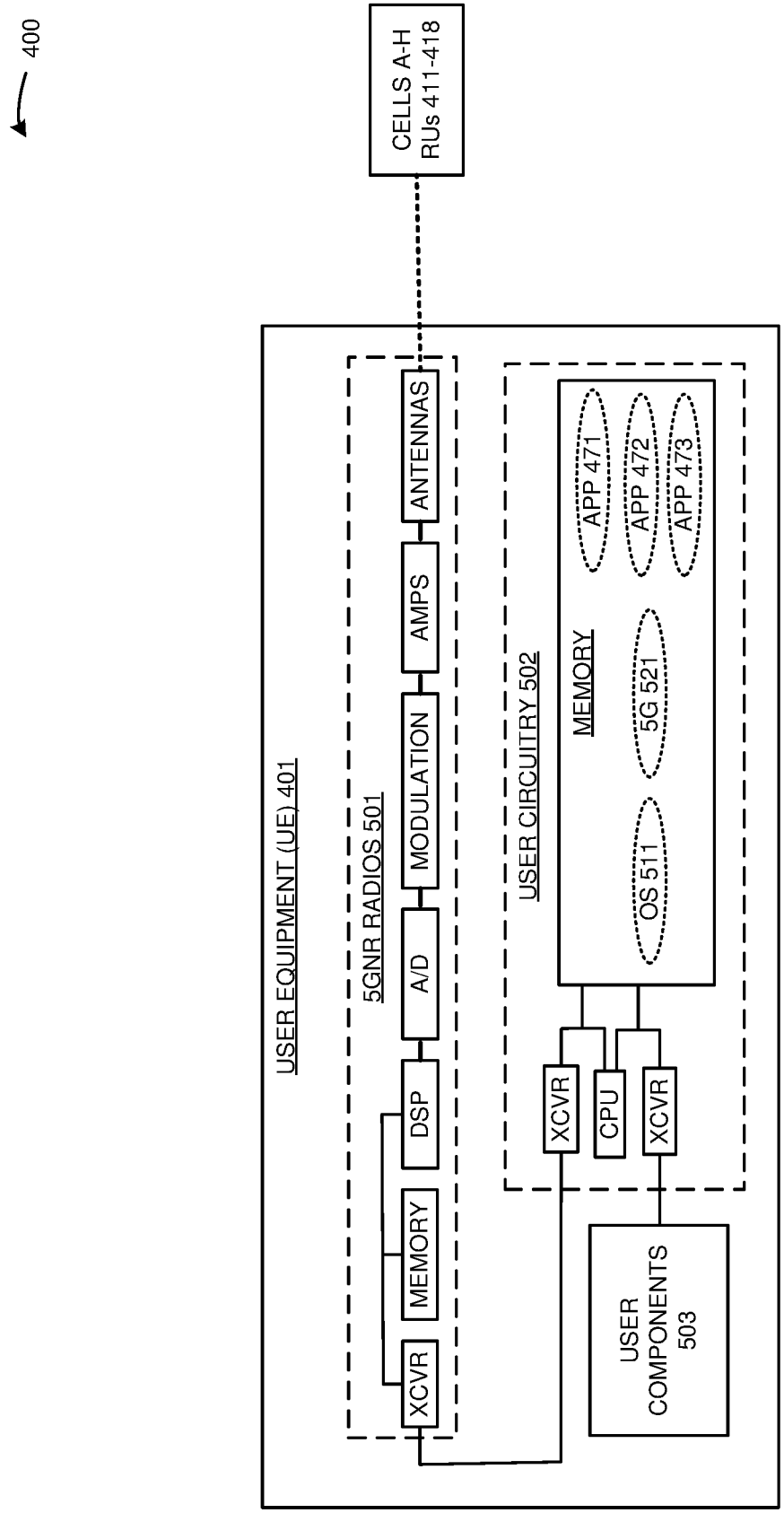
FIG. 5 illustrates the UE in the 5G wireless communication network.

FIG. 5 illustrates UE 401 in 5G wireless communication network 400. UE 401 comprises an example of UE 101, although UE 101 may differ. UE 401 comprises 5G New Radio (5GNR) radios 501, user circuitry 502, and user components 503. User components 503 comprise sensors, controllers, displays, or some other user apparatus that consumes wireless data service. 5GNR radios 501 comprise antennas, amplifiers, filters, modulation, analog-to-digital interfaces, DSP, memory, and transceivers that are coupled over bus circuitry. User circuitry 502 comprises memory, CPU, user interfaces and components, and transceivers that are coupled over bus circuitry. The memory in user circuitry 502 stores operating system (OS) 504, 5G applications 521, and user applications (APPs) 471-473 for respective network slices 441-443. 5G applications 521 comprises components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radios 501 are wirelessly coupled to RUs 411-418 over 5GNR links. Transceivers (XCVRs) in 5GNR radios 501 are coupled to transceivers in user circuitry 502. Transceivers in user circuitry 502 are coupled to user components 503. The CPU in user circuitry 502 executes OS 511, 5G applications 521, and APPs 471-473 to exchange network signaling and user data with cells A-H over RUs 411-418.

Figure 6:
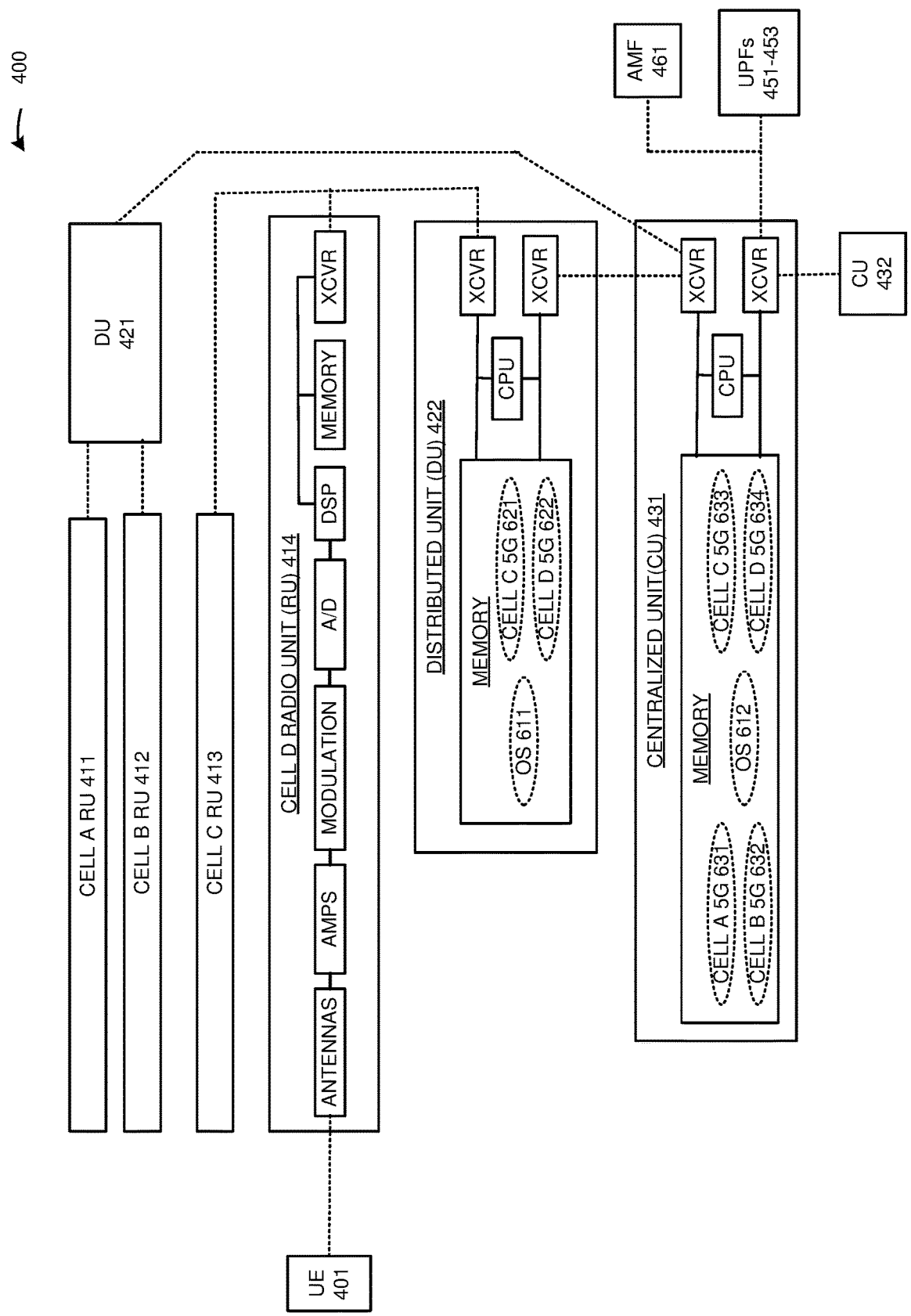
FIG. 6 illustrates a Radio Unit (RU), Distributed Unit (DU), and Centralized Unit (CU) in the 5G wireless communication network.

FIG. 6 illustrates Radio Unit (RU) 414, Distributed Unit (DU) 422, and Centralized Unit (CU) 431 that comprise wireless network cell D in 5G wireless communication network 400. RU 414, DU 422, and CU 431 comprise an example of wireless access nodes 111-113 although nodes 111-113 may differ. RU 414 comprises an example of RUs 411-413 and 415-418. DU 422 comprises an example of DUs 421 and 423-424. CU 431 comprises an example of CU 432. RU 414 comprises 5GNR antennas, amplifiers, filters, modulation, analog-to-digital interfaces, DSP, memory, and transceivers that are coupled over bus circuitry. DU 422 comprises memory, CPU, user interfaces and components, and transceivers that are coupled over bus circuitry. The memory in DU 422 stores OS 611, Cell C 5G APPs 621, and Cell D 5G APPs 622. 5G APPs 621-622 comprise PHY, MAC, and RLC. CU 431 comprises memory, CPU, user interfaces and components, and transceivers that are coupled over bus circuitry. The memory in CU 431 stores OS 612, Cell A 5G APPs 631, Cell B 5G APPs 632, Cell C 5G APPs 633, and Cell D 5G APPs 633. 5G APPs 631-634 comprises PDCP, SDAP, and RRC. The antennas in RU 414 are wirelessly coupled to UE 401 over a 5GNR link. Transceivers in RU 414 are coupled to transceivers in DU 422. Transceivers in DU 422 are coupled to transceivers in CU 431. Transceivers in CU 431 are coupled to, CU 432, AMF 461, and UPFs 451-453. The CPU in RU 414, DU 422, and CU 431 execute OS 611-612, 5G APPs 621-622, and 5G APPs 631-634 to exchange network signaling between UE 401, CU 432, and AMF 461. The CPU in RU 414, DU 422, and CU 431 execute OS 611-612, 5G APPs 621-622, and 5G APPs 631-634 to exchange user data between UE 401 and UPFs 451-453. Network cell D is formed by a combination of RU 414, Cell D 5G APPs 622 executing in DU 422, and Cell D 5G APPs 634 executing in CU 431.

Figure 7:
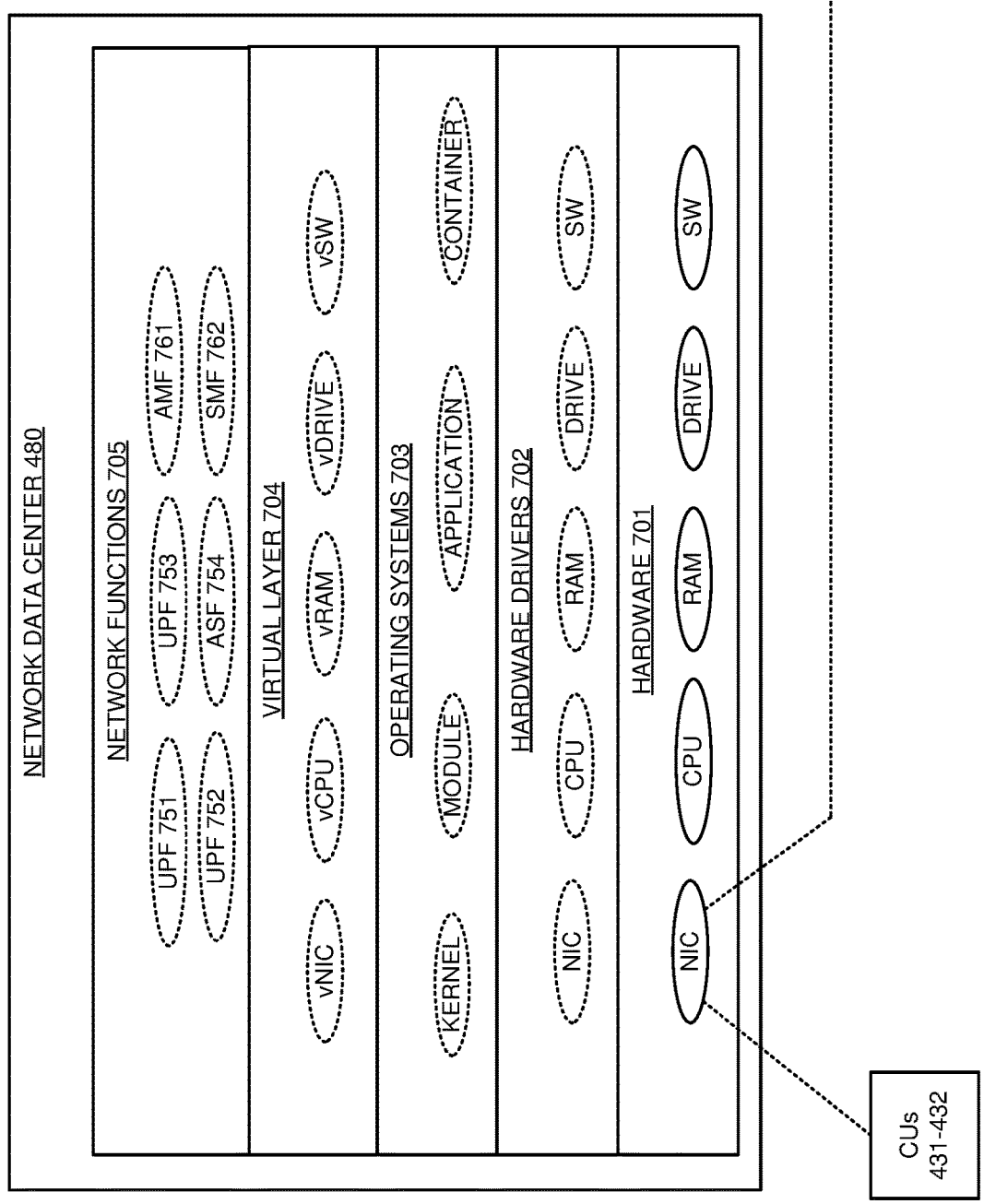
FIG. 7 illustrates a network data center in the 5G wireless communication network.

FIG. 7 illustrates network data center 480 in 5G wireless communication network 400. Network data center 480 comprises an example of wireless network slice 114. Network data center 480 comprises hardware 701, hardware drivers 702, operating systems 703, virtual layer 704, and network functions 705. Hardware 701 comprises Network Interface Cards (NIC), Central Processing Units (CPU), Random Access Memory (RAM), Memory Drives (DRIVE), and Data Switches (SW). Hardware drivers 702 comprise software that is resident in the NIC, CPU, RAM, DRIVE, and SW. Operating systems 703 comprise kernels, modules, applications that form containers to execute virtual layer 704 and network functions 705. Virtual layer 704 comprises vNIC, vCPU, vRAM, vDRIVE, and vSW. Network functions 705 comprise UPF software 751-753, ASF software 754, AMF software 761, and SMF software 762. Other network function software like Policy Control Function (PCF) and Network Exposure Function (NEF) are typically present but omitted for clarity. Network data center 480 may be located at a single site or be distributed across multiple geographic locations. The NIC in hardware 701 are coupled to CUs 431-432 and to external systems like AS. Hardware 701 executes hardware drivers 702, operating systems 703, virtual layer 704, and network functions 705 to form and operate slices 441-443, AMF 461, and SMF 462.

Figure 8:
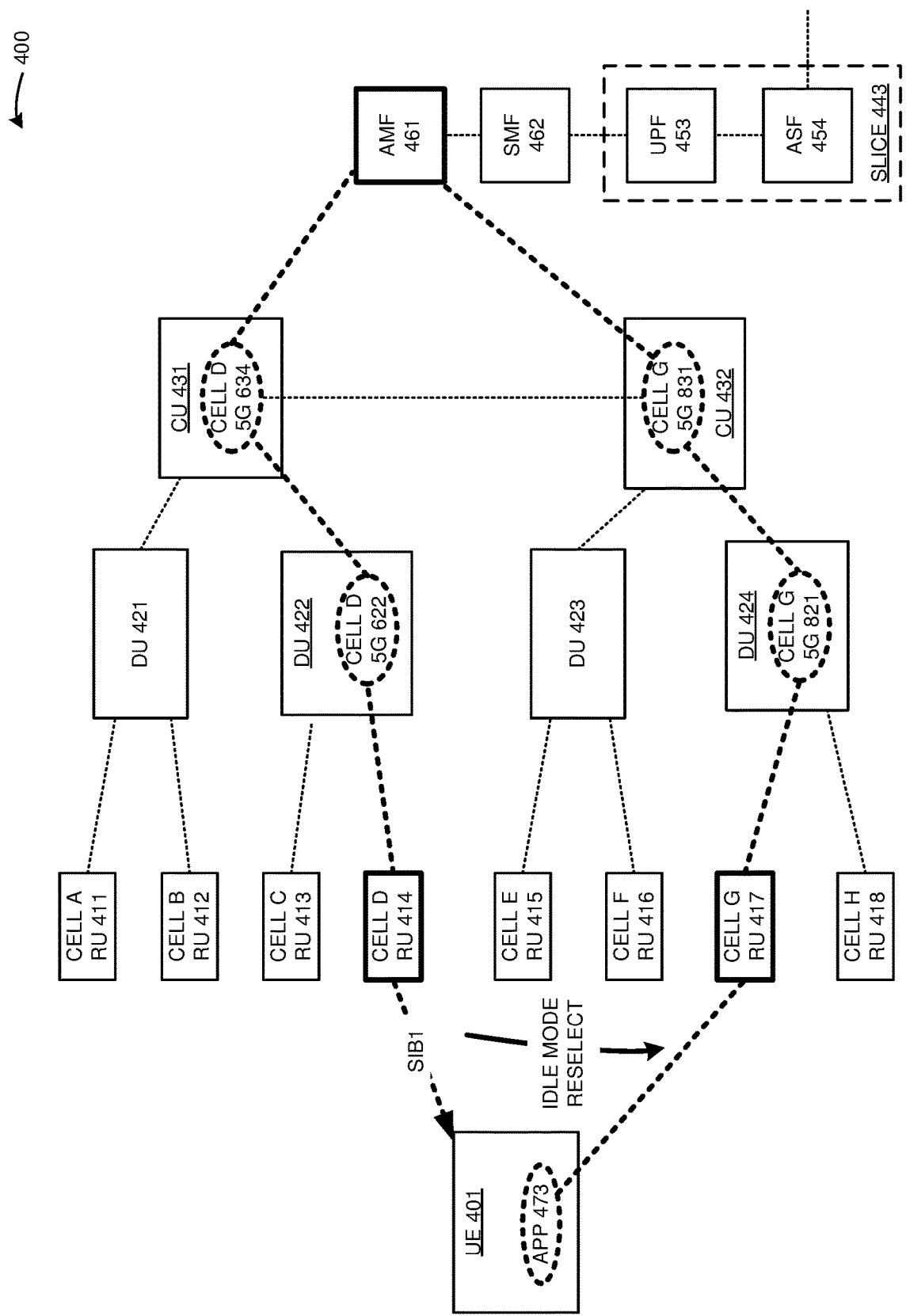
FIG. 8 illustrates an exemplary operation of the 5G wireless communication network to serve the UE over a wireless network slice.

FIG. 8 illustrates an exemplary operation of 5G wireless communication network 400 to serve UE 401 over wireless network slice 443. Wireless network cell D comprises RU 414, 5G APPs 622 for cell D executing in DU 422 (PHY, MAC, RLC), and 5G APPs 634 for cell D executing in CU 431 (PDCP, SDAP, RRC). The RRC in 5G APPs 634 for cell D in CU 431 receives slice status data over X2 signaling from the RRCs for cells A-C and E-H that indicates their current support for individual slices 441-443. In response to the X2 signaling, the RRC in 5G APPs 634 for cell D in CU 431 removes overloaded cell/slice combinations from its SIB 1 broadcast to mitigate the overload. The RRC in 5G APPs 634 for cell D in CU 431 adds recovered cell/slice combinations back to the SIB 1 broadcasts to improve capacity. The RRC in 5G APPs 634 for cell D in CU 431 drives RU 414 to wirelessly broadcast the SIB 1 that indicates the individual cell IDs A-H and the individual slice IDs 441-443 that are currently served by each cell ID.

While in idle mode on RU 414 of cell D, UE 401 launches APP 473 that uses wireless network slice 443. Based on the SIB 1 from RU 414 of cell D, the RRC in UE 401 determines that cell D does not serve wireless network slice 443 and that cells B, C, F, and G do serve slice 443. In response, the RRC in UE 401 re-selects cell G based on SIB 1 and other factors like RU strength and slice load. To perform the re-selection to cell G, the RRC in UE 401 and the RRC for cell G in 5G APPs 822 in CU 432 exchange RRC attachment signaling, and the RRC for cell G and AMF 461 exchange set-up signaling. The discussion proceeds to FIG. 9.

Figure 9:
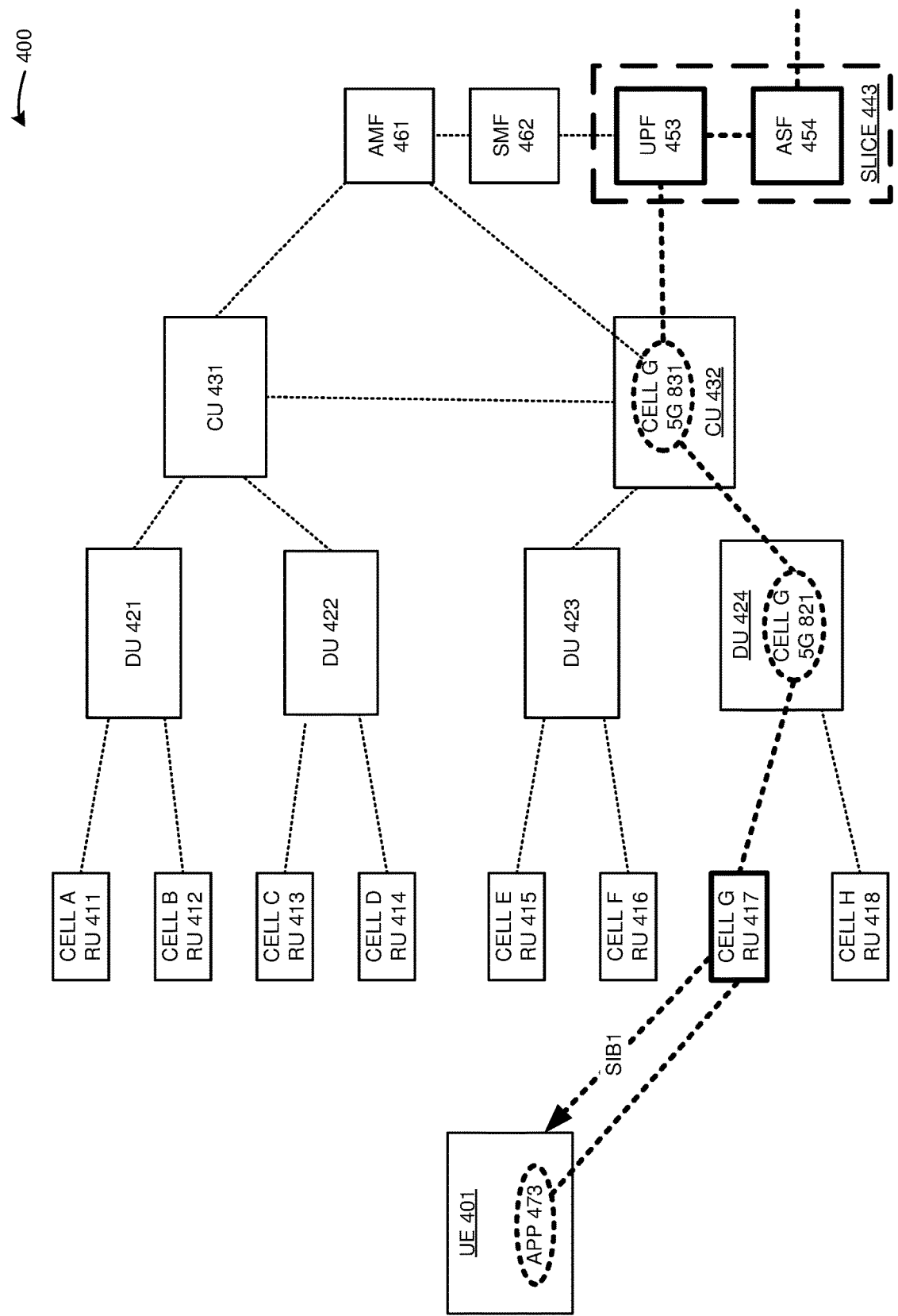
FIG. 9 illustrates an exemplary operation of the 5G wireless communication network to serve the UE over the wireless network slice.

FIG. 9 illustrates an exemplary operation 5G wireless communication network 400 to serve UE 401 over wireless network slice 443. Wireless network cell G comprises RU 417, 5G APPs 821 for cell G executing in DU 424 (PHY, MAC, RLC), and 5G APPs 831 for cell G executing in CU 432 (PDCP, SDAP, RRC). After the re-selection described above for FIG. 8, APP 473 in UE 401 and ASF 454 in slice 443 exchange user data over RU 417 for cell G, 5G APPs 821 for cell G in DU 424, 5G APPs 831 for cell G in CU 432, and UPF 453 in slice 443. ASF 454 may exchange the user data with external systems like a remote AS.

The RRC in 5G APPs 831 for cell G in CU 432 receives slice status data over X2 signaling from the RRCs for cells A-C and E-H that indicates their current support for individual slices 441-443. In response to the X2 signaling, the RRC in 5G APPs 831 for cell G in CU 432 removes overloaded cell/slice combinations from its SIB 1 broadcast to mitigate the overload. The RRC in 5G APPs 831 for cell G in CU 432 adds recovered cell/slice combinations back to the SIB 1 broadcasts to improve capacity. The RRC in APPs 831 for cell G in CU 432 drives RU 417 to wirelessly broadcast the SIB 1 that indicates the individual cell IDs A-H and the individual slice IDs 441-443 that are currently served by each cell ID. UE 401 now receives SIB 1 from RU 417.

The wireless data network circuitry described above comprises computer hardware and software that form special-purpose networking circuitry to serve UEs over wireless network slices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs over wireless network slices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) over a wireless network slice, the method comprising:
    a source wireless access node executing a Radio Resource Control (RRC);
    the RRC exchanging X2 signaling with other RRCs in other wireless access nodes that indicates the wireless network slices served by the source wireless access node and the other wireless access nodes;
    in response to the X2 signaling, the RRC generating a Session Information Block (SIB) that indicates the wireless network slices served by the source wireless access node and the other wireless access nodes and driving a Radio Unit (RU) in the source wireless access node to wirelessly broadcast the SIB that indicates the wireless network slices served by the source wireless network node and the other wireless access nodes;
    the UE executing a user application that uses the wireless network slice;
    the UE wirelessly receiving the SIB from the source wireless access node, determining when the source wireless access node does not serve the wireless network slice based on the SIB, and when the source wireless access node does not serve the wireless network slice, the UE reselecting one of the other wireless access nodes that serves the wireless network slice based on the SIB responsive to executing the user application that uses the wireless network slice; and
the UE wirelessly attaching to the selected one of the other wireless access nodes.

2. The method of claim 1 wherein the SIB lists cell Identifiers (IDs) for the source wireless access node and the other wireless access nodes in association with the slice IDs for the wireless network slices served by the source wireless access node and the other wireless access nodes.

3. The method of claim 1 wherein the SIB comprises a System Information Block One (SIB 1).

4. The method of claim 1 wherein the wireless network slice comprises an Application Server Function (ASF).

5. The method of claim 1 further comprising:
the UE wirelessly exchanging user data for the wireless network slice with the selected one of the other wireless access nodes;
the selected one of the other wireless access nodes wirelessly exchanging the user data with the UE and exchanging the user data with the wireless network slice; and
the wireless network slice exchanging the user data with the selected one of the other wireless access nodes.

6. The method of claim 1 further comprising:
one of the other wireless access nodes detecting a slice overload for the wireless network slice;
the RRC exchanging additional X2 signaling with the one of the other wireless access nodes that indicates the slice overload; and
the RRC modifying the SIB to indicate the one of the other wireless access nodes no longer serves the wireless network slice responsive to the additional X2 signaling.

7. The method of claim 1 further comprising:
one of the other wireless access nodes receiving a configuration to serve the wireless network slice;
the RRC exchanging additional X2 signaling with the one of the other wireless access nodes that indicates the one of the other wireless access nodes now serves the wireless network slice; and
the RRC modifying the SIB to indicate the one of the other wireless access nodes now serves the wireless network slice responsive to the additional X2 signaling.

8. The method of claim 1 wherein the UE wirelessly attaching to the selected one of the other wireless access nodes comprises performing random access over a Random Access Channel (RACH) to the selected one of the other wireless access nodes.

9. The method of claim 1 wherein the UE executing the user application comprises the UE executing the user application that uses the wireless network slice when the UE is idle on the source wireless access node.

10. The method of claim 1 wherein the wireless network slice comprises a User Plane Function (UPF).

11. A wireless communication network to serve a User Equipment (UE) over a wireless network slice, the wireless communication network comprising:
a source wireless access node configured to execute a Radio Resource Control (RRC);
the RRC configured to exchange X2 signaling with other RRCs in other wireless access nodes that indicates the wireless network slices served by the source wireless access node and the other wireless access nodes;
in response to the X2 signaling, the RRC configured to generate a Session Information Block (SIB) that indicates the wireless network slices served by the source wireless access node and the other wireless access nodes and drive a Radio Unit (RU) in the source wireless access node to wirelessly broadcast the SIB that indicates the wireless network slices served by the source wireless access node and the other wireless access nodes;
the UE configured to execute a user application that uses the wireless network slice;
the UE configured to wirelessly receive the SIB from the source wireless access node, determine when the source wireless access node does not serve the wireless network slice based on the SIB, and when the source wireless access node does not serve the wireless network slice, the UE configured to re-select one of the other wireless access nodes that serves the wireless network slice based on the SIB responsive to the execution of the user application that uses the wireless network slice; and
the UE configured to wirelessly attach to the selected one of the other wireless access nodes.

12. The wireless communication network of claim 11 wherein the SIB lists cell Identifiers (IDs) for the source wireless access node and the other wireless access nodes in association with the slice IDs for the wireless network slices served by the source wireless access node and the other wireless access nodes.

13. The wireless communication network of claim 11 wherein the SIB comprises a System Information Block One (SIB 1).

14. The wireless communication network of claim 11 wherein the wireless network slice comprises an Application Server Function (ASF).

15. The wireless communication network of claim 11 further comprising:
the UE configured to wirelessly exchange user data for the wireless network slice with the selected one of the other wireless access nodes;
the selected one of the other wireless access nodes configured to wirelessly exchange the user data with the UE and exchange the user data with the wireless network slice; and
the wireless network slice configured to exchange the user data with the selected one of the other wireless access nodes.

16. The wireless communication network of claim 11 further comprising:
one of the other wireless access nodes configured to detect a slice overload for the wireless network slice;
the RRC configured to exchange additional X2 signaling with the one of the other wireless access nodes that indicates the slice overload; and
the RRC configured to modify the SIB to indicate the one of the other wireless access nodes no longer serves the wireless network slice responsive to the additional X2 signaling.

17. The wireless communication network of claim 11 further comprising:
one of the other wireless access nodes configured to receive a configuration to serve the wireless network slice;
the RRC configured to exchange additional X2 signaling with the one of the other wireless access nodes that indicates the one of the other wireless access nodes now serves the wireless network slice; and
the RRC configured to modify the SIB to indicate the one of the other wireless access nodes now serves the wireless network slice responsive to the additional X2 signaling.

18. The wireless communication network of claim 11 wherein the UE is configured to perform a random access over a Random Access Channel (RACH) to the selected one of the other wireless access nodes to wirelessly attach to the selected one of the other wireless access nodes.

19. The wireless communication network of claim 11 wherein the UE is configured to execute the user application that uses the wireless network slice when the UE is idle on the source wireless access node.

20. The wireless communication network of claim 11 wherein the wireless network slice comprises a User Plane Function (UPF).

\* \* \* \* \*